United States Patent Office 3,285,979
Patented Nov. 15, 1966

3,285,979
CHLORINATION PROCESS
Edwin George Edward Hawkins, Lower Kingswood, England, assignor to The Distillers Company Limited, Edinburgh, Scotland, a British company
No Drawing. Filed June 7, 1965, Ser. No. 462,135
Claims priority, application Great Britain, May 2, 1962, 16,765/62
9 Claims. (Cl. 260—654)

This application is a continuation in part of my prior application Serial No. 271,601 filed on April 9, 1963, now abandoned.

The present invention relates to the chlorination of 1,3-dichlorobut-2-ene to 2,3,4-trichlorobut-1-ene.

The chlorination of 1,3-dichlorobut-2-ene is known and a process has been described which gave rise to a mixture of products namely 2,3,4-trichlorobut-1-ene, 1,2,3,3-tetrachlorobutane and 1,2,2,3,4-pentachlorobutane. The pentachlorobutane arose by the over-chlorination of the trichlorobutene and hence the production of this unwanted product could be prevented by reducing the amount of chlorine employed. However in the prior art process the production of the tetrachlorobutane could not be prevented and in order to obtain high yields of the trichlorobutene it was necessary to operate at low temperatures i.e. at $-60°$ C.

An object of the present invention is to provide a useful practical process for the chlorination of 1,3-dichlorobut-2-ene which gives good yields of 2,3,4-trichlorobut-1-ene and relatively small yields of unwanted chlorination products.

According to the present invention the process for the production of 2,3,4-trichlorobut-1-ene comprises passing chlorine gas into 1,3-dichlorobut-2-ene containing a free radical inhibitor selected from the group consisting of aromatic hydroxy compounds substituted in the aromatic nucleus by an electron donor group and aromatic secondary amines.

Free radical inhibitors are well known in connection with the inhibition of polymerization and autoxidation reactions. The free radical inhibitors to be used in the process of the present invention are well known both as polymerisation inhibitors for monomers containing trace quantity of oxygen and autoxidation inhibitors. See "Inhibition of the Autoxidation of Organic Substances in the Liquid Phase" by K. U. Ingold, National Research Council Publication No. 6537; "High Polymers" edited by H. Mark, volume 10 by C. E. Schildnecht entitled "Polymer Processes" pages 6, 29 and 30; and "Air Oxidation of Hydrocarbons" by C. E. Boozer et al. Journal of the American Chemical Society, volume 77, pages 3233 through 3237. It is believed that their ability to act in the two capacities is inter-related and is due to their ability to react with free radicals. A well known class of free radical inhibitor which can be used in the process of the present invention is the aromatic hydroxy compound substituted in the aromatic nucleus with an electric donor group. These are often referred to as phenolic inhibitors. Examples of electron donor groups are hydroxy, alkoxy, alkyl (including cycloalkyl), aryl, aralkyl and dialkylaminoalkyl groups. In practice where alkyl groups and derivatives thereof are used, the lower alkyl groups (10 carbon atoms) are preferred as a matter of chemical convenience. The other well known class of free radical inhibitor which can be used in the process of the present invention is the aromatic secondary amine. The secondary amine may be a mono-aromatic compound, but it is preferably di-aromatic. The term is also used to include di-aromatic amines in which the nitrogen atom together with parts of the aromatic nuclei forms part of a third cyclic ring structure.

Examples of phenolic inhibitors are alkyl substituted phenols such as 2-tert.butyl-4,6-dimethylphenol, 2,2-di-t-butyl, 4-methylphenol and tertiary butyl catechol; alkyl, hydroxyl substituted phenols such as 2,5-di-tert.butyl hydroquinone; alkyl, alkoxy substituted phenols such as 2,6-di-tert.butyl-4-methoxyphenol; alkyl substituted bis phenols such as 4,4'-isopropylidenebis (2-methylphenol), (or called o-dicresylolpropane), 2,2'-methylenebis(4-methyl-6-tert.butylphenol), 4,4'-methylenebis(2-methyl - 6 - tert. butylphenol), 4,4'-bis(2,6-di-tert.butylphenol), 4,4'-methylenebis(2,6-di-tert.butylphenol) and 4,4' - butylidenebis(2-tert.butyl-5-methylphenol); thio-bridged bisphenols such as 2,2'-thiobis(4-methyl-6-tert.butylphenol), 4,4'-thiobis (2-methyl-6 - tert.butylphenol) and 4,4' - thiobis(2 - tert. butyl-5-methylphenol); cyclo-alkyl, alkyl substituted bis phenols such as 2,2'-methylene bis(4-methyl-6-α-methylcyclohexyl) phenol; and trinuclear phenols such as 2,6-bis(2-hydroxy-3-tert.butyl-5 - methylbenzyl) - 4 - methylphenol. All these phenolic inhibitors are commercially available compounds.

Examples of aromatic secondary amines are phenothiazine and its derivatives such as methylene blue; phenyl α- and β-naphthylamine, diphenylamine and N,N'-diphenyl-p-phenylene diamine. All these aromatic secondary amines are commercially available compounds.

Amino groups are electron donor groups and thus derivatives of p-aminophenol and the like may be suitable for use in the process of the present invention both as phenolic inhibitors and as aromatic secondary amines.

Small quantities of inhibitor are sufficient to allow the process of the present invention to give the desired 2,3,4-trichlorobut-1-ene. Preferably the concentration of the inhibitor lies in the range 0.1 to 1% by weight on the weight of 1,3-dichlorobut-2-ene.

The chlorination reaction according to the process of the present invention is effected by passing the chlorine gas into the 1,3-dichlorobut-2-ene, which, if desired, can be dispersed in a suitable liquid vehicle, e.g. a solvent such as carbon tetrachloride. The speed of the addition of the chlorine does not appear to be critical and it is preferred that the reaction mixture shall be stirred during the chlorination reaction. The amount of chlorine used should not be in excess of the stoichiometrical amount required by the chlorination reaction.

The temperature at which the reaction is carried out does not appear to be critical. Preferably it is not allowed to exceed about 50° C. because the yield decreases at higher temperatures. Most suitably the reaction can be carried out at room temperature. Surprisingly it is found the reduction of the temperature of the reaction to, for example, $-60°$ C. does not increase the proportion of 2,3,4-trichlorobut-1-ene in the reaction product.

2,3,4-trichlorobut-1-ene is a useful chemical intermediate being particularly valuable because it can be converted to 2,3-dichloro-1,3-butadiene, which is a useful polymerisable monomer.

The following examples illustrate the process of the present invention: in all cases the chlorine was completely absorbed.

*Example 1*

125 grams of 1,3-dichlorobut-2-ene was placed in a reaction vessel fitted with a stirrer, and 0.5 gram of tertiary butyl catechol were added. Chlorine gas was passed into the reaction mixture at about 0.3 gram per minute for 170 minutes while the temperature of the reaction mixture was maintained between 10 and 15° C. At the end of the reaction the reaction mixture was washed and the products obtained on distillation were 124 grams of 2,3,4-trichlorobut-1-ene, 9 grams of tetrachlorobutanes, 16 grams of unreacted starting material and 3 grams of high boiling material.

Example 2

The process of Example 1 was repeated at −50° C. for 150 minutes. The product on distillation contained 131 grams fo 2,3,4-trichlorobut-1-ene, 18 grams of tetrachlorobutane, 3 grams of high boiling material and 2 grams of unreacted starting material.

Example 3

The process of Example 1 was repeated but 1 gram of tertiary butyl catechol was employed. The reaction product contained 123 grams, 2,3,4 - trichlorobut-1-ene, 9 grams of tetrachlorobutane, 5 grams of high boiling material and 15 grams of unreacted 1,3-dichlorobut-2-ene.

Example 4

The process of Example 1 was repeated but 100 millilitres of carbon tetrachloride were added to the reaction mixture. Distillation of the reaction product gave 134 grams of 2,3,4-trichlorobut-1-ene, 11 grams of tetrachlorobutane, 6 grams of high boiling material and 5 grams of unreacted 1,3-dichlorobut-2-ene.

Example 5

The process of Example 1 was repeated and 5 grams of cuprous chloride were added to the reaction mixture. At the end of 150 minutes the reaction was stopped and the reaction mixture water washed. Distillation of the reaction product gave 126 grams of 2,3,4-trichlorobut-1-ene, 12 grams of tetrachlorobutanes, 3 grams of high boiling material and 10 grams of unreacted 1,3-dichlorobut-2-ene.

Example 6

The process of Example 1 was repeated but the temperature of the reaction mixture was maintained between 14 and 18° C. and the rate of addition of chlorine was doubled. At the end of 80 minutes the reaction mixture was water washed and distillation of the reaction product gave 127 grams of 2,3,4-trichlorobut-1-ene, 11 grams of tetrachlorobutanes, 2 grams of high boiling material and 12 grams of unreacted 1,3-dichlorobut-2-ene.

Examples 7 to 10

The process of Example 1 was repeated but the tertiary butyl catechol was replaced by the same weight of other free radical inhibitors of the phenolic or secondary amine type. The weight of the products obtained on distillation are given in grams in the following table.

| Ex. No. | Inhibitor | 2,3,4-tri-chloro-but-1-ene | Tetra-chloro-butane | Starting material | High boiling material |
|---|---|---|---|---|---|
| 7 | 2,6-di-t-butyl-4-methylphenol. | 115 | 15 | 7 | 14 |
| 8 | 2,6-di-t-butyl-α-dimethylamino-p-cresol. | 113 | 17 | 16 | 4 |
| 9 | Phenothiazine | 129 | 12 | 13 | 2 |
| 10 | N,N'-di-β-naph-thyl-p-phenyl-enediamine. | 134 | 10 | 10 | 2 |

Essentially similar results are obtained if the above examples are repeated replacing the inhibitors used with any of the other phenolic or secondary amine inhibitors mentioned previously in this specification.

By way of comparison the process of Example 1 was repeated but with the t-butyl catechol omitted. The temperature was maintained at 10–15° C. and at the end of 2 hours the weight of the reaction mixture had increased by approximately the same amount as in Example 1. Distillation of the product gave 73 grams of 2,3,4-trichlorobut-1-ene, 50 grams of tetrachlorobutanes, 10 grams of high boiling material and 27 grams of unreacted 1,3-dichlorobut-2-ene.

I claim:

1. A process for the production of 2,3,4-trichlorobut-1-ene which comprises passing chlorine gas into 1,3-dichlorobut-2-ene containing a free radical inhibitor, the temperature of the reaction mixture being maintained below 50° C.

2. A process as claimed in claim 1, wherein the concentration of the free radical inhibitor lies in the range 0.1 to 1% by weight on the weight of the 1,3-dichlorobut-2-ene.

3. A process as claimed in claim 1, wherein the amount of chlorine does not exceed the stoichiometric amount required by the chlorination reaction.

4. A process as claimed in claim 1 wherein the free radical inhibitor is selected from the group consisting of
2-tert.butyl-4,6-dimethylphenol,
2,2-di-t-butyl-4-methylphenol,
tertiary butyl catechol,
2,5-di-tert.butyl hydroquinone,
2,6-di-tert.butyl-4-methoxyphenol,
4,4'-isopropylidenebis (2-methylphenol),
2,2'-methylenebis (4-methyl-6-tert.butylphenol),
4,4'-methylenebis (2-methyl-6-tert.butylphenol),
4,4'-bis(2,6-di-tert.butylphenol),
4,4'-methylenebis(2,6-di-tert.butylphenol),
4,4'-butylidenebis(2-tert.butyl-5-methylphenol),
2,2'-thiobis(4-methyl-6-tert.butylphenol),
4,4'-thiobis(2-methyl-6-tert.butylphenol), and
4,4'-thiobis(2-tert.butyl-5-methylphenol),
2,2'-methylenebis(4-methyl-6-α-methylcyclohexyl)phenol,
2,6-bis(2-hydroxy-3-tert.butyl-5-methylbenzyl)-4-methylphenol,
phenothiazine,
methylene blue,
phenyl-α-naphthylamine,
phenyl-β-naphthylamine,
diphenylamine, and N,N'-diphenyl-p-phenylenediamine.

5. A process as claimed in claim 1, wherein the free radical inhibitor is tertiary butyl catechol.

6. A process as claimed in claim 1, wherein the free radical inhibitor is 2,6-di-t-butyl-4-methylphenol.

7. A process as claimed in claim 1, wherein the free radical inhibitor is 2,6 - di-t - butyl - α - dimethylamino-p-cresol.

8. A process as claimed in claim 1, wherein the free radical inhibitor is phenolthiazine.

9. A process as claimed in claim 1, wherein the free radical inhibitor is N,N'-di-β-naphthyl - p - phenylenediamine.

References Cited by the Examiner

UNITED STATES PATENTS

| | | | |
|---|---|---|---|
| 1,950,433 | 3/1934 | Carothers et al. | 260—652.5 |
| 1,952,122 | 3/1934 | Deanesly | 260—654 |
| 1,964,720 | 7/1934 | Coffman | 260—654 |
| 1,965,369 | 7/1934 | Carothers et al. | 260—654 |
| 2,136,333 | 11/1938 | Coleman et al. | 260—652.5 |
| 2,296,614 | 9/1942 | Hearne | 260—654 |
| 2,299,477 | 10/1942 | Hearne et al. | 260—654 |
| 2,440,800 | 5/1948 | Hanford et al. | 260—658 |
| 2,770,661 | 11/1956 | Horlenko | 260—658 |
| 2,837,580 | 6/1958 | Barnhart | 260—658 |

OTHER REFERENCES

Mayo et al.: "Chemical Reviews," vol. 27 (1940, pp. 367–372).

LEON ZITVER, *Primary Examiner.*

K. V. ROCKEY, *Assistant Examiner.*